UNITED STATES PATENT OFFICE.

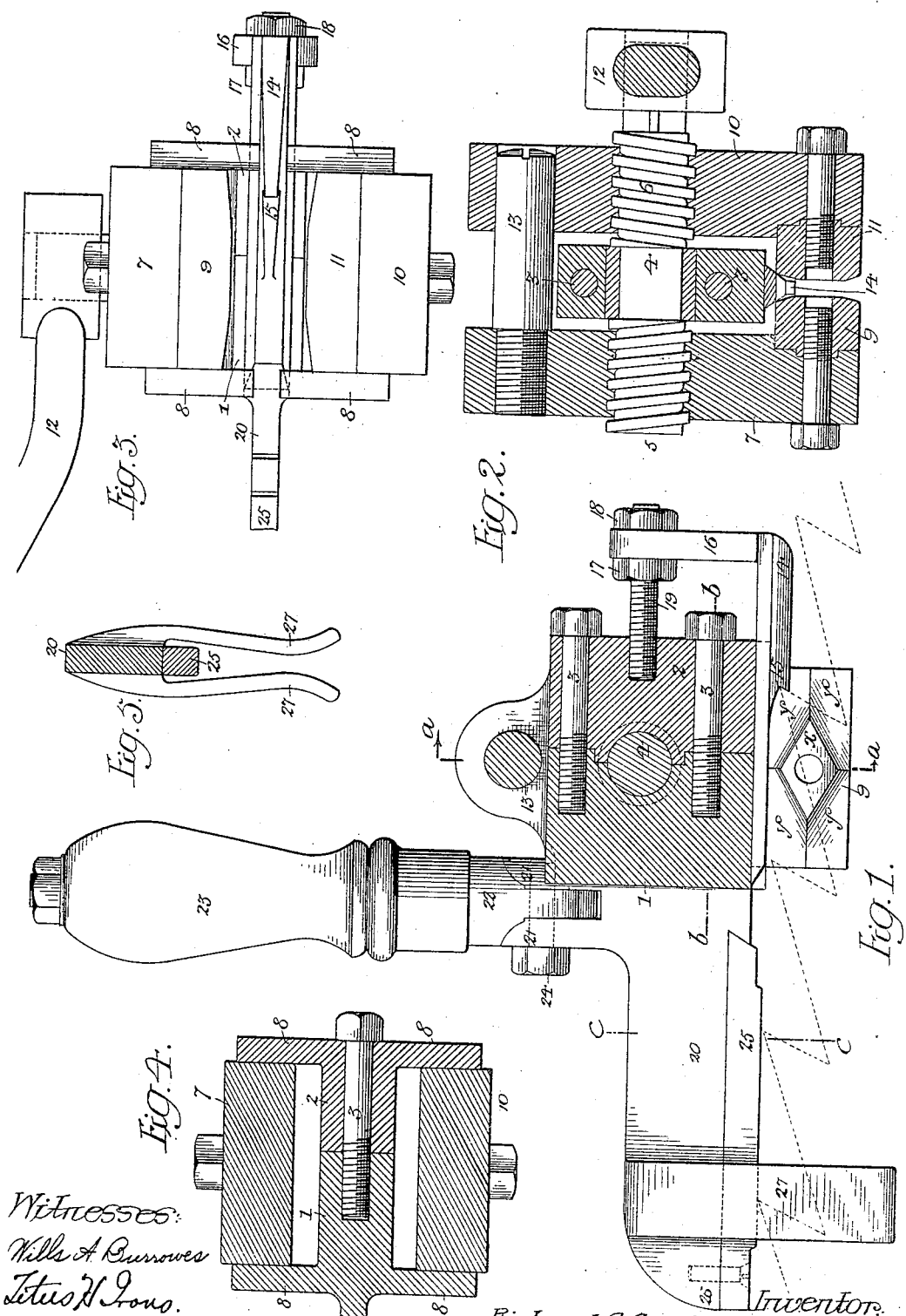

RICHARD C. CHARLTON, OF PHILADELPHIA, PENNSYLVANIA, ASSIGNOR TO HENRY DISSTON AND SONS INCORPORATED, OF PHILADELPHIA, PENNSYLVANIA, A CORPORATION OF PENNSYLVANIA.

SIDE-DRESSING TOOL FOR SAW-TEETH.

No. 816,433.

Specification of Letters Patent.

Patented March 27, 1906.

Application filed December 16, 1904. Serial No. 237,121.

*To all whom it may concern:*

Be it known that I, RICHARD C. CHARLTON, a citizen of the United States, residing in Philadelphia, Pennsylvania, have invented certain Improvements in Side-Dressing Tools for Saw-Teeth, of which the following is a specification.

The object of my invention is to so construct a side-dressing tool for saw-teeth as to insure the effective and uniform action of the dies upon the opposite sides of each tooth. This object I attain in the manner hereinafter set forth, reference being had to the accompanying drawings, in which—

Figure 1 is a longitudinal section, partly in elevation, of a side-dressing tool constructed in accordance with my invention. Fig. 2 is a view, partly in elevation and partly in transverse section, on the line $a\ a$, Fig. 1. Fig. 3 is an inverted plan view of the tool, showing the dressing-dies fully retracted. Fig. 4 is a sectional plan view on the line $b\ b$, Fig. 1; and Fig. 5 is a transverse section on the line $c\ c$, Fig. 1.

The fixed body of the tool is an H-shaped structure divided transversely in the center, the two parts 1 and 2 of said structure being securely confined together by means of bolts 3 and forming a bearing for the reduced central portion 4 of an operating-screw which has a right-hand threaded portion 5 on one side of said fixed body of the tool and a left-hand threaded portion 6 on the opposite side of the same.

The threaded portion 5 of the operating-screw engages an internal thread in a slide-block 7, which is rigidly guided between front and rear cheeks 8 of the body of the tool, said sliding block having rigidly secured to its lower portion one of the dies 9 for acting upon the saw-tooth. The opposite threaded portion 6 of the operating-screw engages an internal thread in a sliding block 10, likewise guided between front and rear cheek-pieces 8 of the body structure, and has rigidly secured to its lower portion the other die 11, as shown in Fig. 2. When the operating-screw is turned in one direction or the other, therefore, by means of a suitable handle 12 applied to one end of the same, the sliding blocks 7 and 10 and their dies 9 and 11 will be caused to approach or recede from each other, so as to press upon opposite sides of a saw-tooth inserted between them or by retraction therefrom to release the same from pressure and permit a fresh adjustment of the tool upon the saw or of the saw in respect to the tool, so as to bring a new tooth into position for being acted upon. As additional means for steadying the sliding blocks 7 and 10 in their movement from and toward each other said block 7 has a projecting pin 13, which fits snugly in an opening in the block 10.

Each of the dies 9 and 11 is similarly constructed and has a central flat surface $x$ and beveled surfaces $y$, one at each corner. These surfaces $y$ have different degrees of bevel, and each die can be adjusted end for end on its respective block or can be applied to either block. Hence any desired one of either of the beveled surfaces of a die may be caused to act upon the teeth of the saw, the position of each tooth between the dies being determined by a longitudinally-adjustable gage-bar 14, which is mounted in an undercut groove in the body of the tool and has a notch 15 for engagement with the point of the tooth which is being pressed or with the point of a tooth in advance of the same, said gage-bar having an upturned end 16, confined between nuts 17 and 18 on a gage-screw 19, which projects from one end of the body of the tool, as shown in Fig. 1.

The body of the tool has a rearwardly-projecting bar 20, on the top of which are a pair of jaws 21, between which is contained the lower end of the stem 22 of a handle 23, which thus projects from the back of the tool and can be grasped and firmly held by the left hand of the operator while the right hand manipulates the handle 12, whereby movement is imparted to the operating-screws. The stem 22 of the handle 23 is pivoted to the jaws 21 by means of a bolt 24, so that the handle 23 can, if desired, be tipped to one side or the other for greater convenience. On the under side of the arm 20 is a hardened-steel bearing-plate 25, which is beveled at the inner end for engaging with an undercut shoulder on the arm and is secured at the outer end by means of a bolt 26, and the outer end of the arm 20 is provided with depending wings 27, which bear upon the opposite sides of the saw-blade and serve to maintain the tool in line longitudinally therewith.

By the use of an operating-screw with right and left hand threads uniform action of the dies upon the opposite sides of the sawtooth is insured, and such action is effected by the use of one hand, leaving the other hand free to grasp the handle 23 in order to hold the tool in its proper position in respect to the saw, and by the use of a side handle the pressure of the dies upon the tooth of the saw can be effected by a downward pressure of the hand upon the handle 12, thereby permitting the operator to exert his force to better advantage than by pulling a handle toward him in a horizontal plane, as in some devices of this class with which I am familiar.

Having thus described my invention, I claim and desire to secure by Letters Patent—

1. A side-dressing tool having opposite die-carrying blocks and a body of H-shaped cross-section presenting oppositely-projecting cheek-pieces between which said die-carrying blocks are guided, substantially as specified.

2. A side-dressing tool having opposite die-carrying blocks, single operating-screw having a right-hand threaded portion engaging one of said blocks and a left-hand threaded portion engaging the other block, and a body structure in which said operating-screw is rotatably mounted, substantially as specified.

3. A side-dressing tool having opposite die-carrying blocks, a single operating-screw having a right-hand threaded portion engaging one of said blocks, a left-hand threaded portion engaging the other block, and a reduced portion between the said threaded portions, a two-part body structure having each part recessed for engagement with said reduced portion of the operating-screw, and means for securing together the two parts of said body structure, substantially as specified.

4. A side-dressing tool having opposite die-carrying blocks, an operating-screw having a right-hand threaded portion engaging one of said blocks and a left-hand threaded portion engaging the other block and a central body structure providing a bearing for said operating-screw and having oppositely-projecting cheek-pieces between which the die-carrying blocks are guided, substantially as specified.

In testimony whereof I have signed my name to this specification in the presence of two subscribing witnesses.

RICHARD C. CHARLTON.

Witnesses:
 E. B. ROBERTS,
 GEO. C. BAUDE.